a glass fiber strand as the strand is being formed.

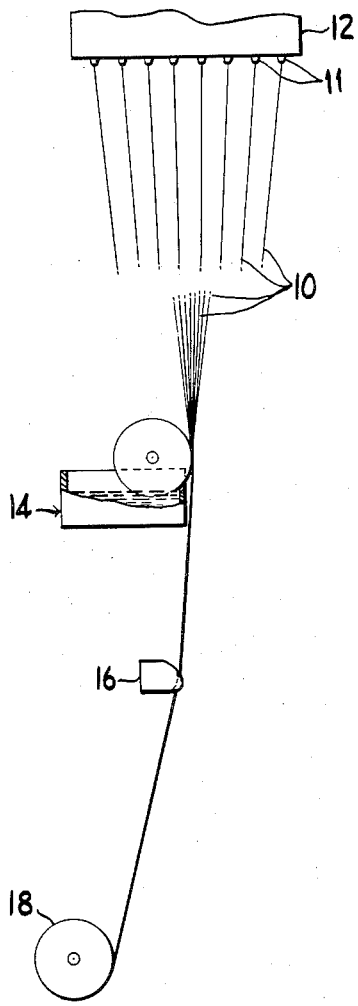

3,025,588
GLASS FIBER TREATMENT
George E. Eilerman, Perrysville, Pa., assignor to Pittsburgh Plate Glass Company, a corporation of Pennsylvania
Filed May 13, 1958, Ser. No. 734,828
5 Claims. (Cl. 28—74)

The present invention relates to a glass fiber treatment and it has particular relation to a size for treating glass fibers which are to be woven into cloth and used as a reinforcement for resins.

A glass fiber strand is composed of a multitude of fine glass filaments which are formed by being drawn at a high rate of speed from molten cones of glass located at the tips of small orifices in a bushing such as shown in U.S. Patent No. 2,133,238. During manufacture, the filaments are coated while moving at a rate of speed of the order of 500 to 20,000 feet per minute with a size which contains a binder to give the strand integrity for workability, i.e., for twisting, plying and weaving. If the strand does not have proper integrity, fuzzing occurs during these operations and eventually the strand breaks. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surface of the glass fibers hydrophobic and compatible with the particular resins with which they are to be employed. Normally glass fibers are hydrophilic and resinophobic and a good bond is not obtained between the glass fibers and the resin. The coupling agent serves as an interlayer between the glass and the resin, and this interlayer bonds the resin and glass fibers together more strongly than they would be if the interlayer was not present. It is theorized by some that there is a strong chemical bond between the glass and one atom or group of atoms in the coupling agent and another strong chemical bond between the resin and another atom or group of atoms in the coupling agent. The bond may be formed by hydrogen bonding, interpolymerization or other known methods of chemical bonding. Thus, the coupling agent serves as a chemical link or couple between the glass and the resin. It is also thought by others that the coupling agent merely serves to provide a better surface on the glass by which superior mechanical bonding of the resin can be obtained. In any event, various chemical compounds when deposited on the glass fiber surface permit the glass fiber surface to form a stronger bond with the resin. These coupling agents greatly increase the dry and wet flexural strength of the glass fiber-resin laminates.

When glass fibers are used in the form of strands, i.e., roving or chopped strands, for resin reinforcement the coupling agent is usually combined with the size and applied to the fibers during their attenuation and forming. The size employed is usually an aqueous dispersion of a film forming, synthetic resin latex made by emulsion polymerization of an ethylenic monomer, for example, polyvinyl acetate latex and a textile lubricant or softener. Such a size gives good integrity to the strand and does not have any deleterious effect on the reinforcing properties of the strand; however, it does not permit the strand to be twisted, plied or woven. Strands coated with a latex containing size have been observed to have their filaments break and to fuzz during twisting, plying and weaving.

When the glass fibers are to be employed in the form of woven cloth as a reinforcement for resins, the coupling agent is applied to the fibers after they have been woven into cloth and after the cloth has been cleaned to remove the size. Starch and a vegetable oil are generally employed as the size for glass fibers when they are twisted, plied, and woven into cloth. The starch must be removed prior to lamination of the glass fiber cloth with the resin because the starch prevents the formation of a strong bond between the glass and the resin.

The cleaning of glass fiber cloth is conventionally accomplished by heating the glass to a temperature of 800 to 900° F. for 90 to 120 hours. During this treatment, a coupling agent would be burned off. Thus, the coupling agent is not applied with the starch containing size to the fibers prior to twisting, plying and weaving, but rather is applied to the cloth after it has been treated to remove the starch.

It is a desideratum of the art that glass fiber cloth which does not require the removal of the size and subsequent application of the coupling agent be available for use as a reinforcement for resins. The removal of the size constitutes a costly extra step. The heating of the glass fiber cloth also decreases the tensile strength of the cloth. A separate application of the coupling agent after the heat cleaning further adds to the cost of the glass fiber cloth.

It can be seen, therefore, that it is greatly desired that a size be available for application to glass fibers which permits twisting, plying and weaving of the glass fibers without fuzzing and which does not have to be removed to permit woven cloth produced from the glass fibers to be used for resin reinforcement. It is also desired that a size be provided which permits incorporation therein of a coupling agent so that the application of the size and coupling agent can be accomplished simultaneously during the attenuation and forming of the individual filaments and strands.

Further disadvantages of the use of starch in a size for glass fibers are that the starch containing size must be heated to a temperature of 90–120° F. for application to the glass fibers and glass fibers treated with a starch containing size must be twisted and plied very shortly after the size has been applied to the glass fibers, i.e., one or two days. After several days, the water evaporates from the starch size and the continuous film on the fibers and between the fibers is destroyed. The integrity of the strand is thereby lost and the strand tends to fuzz badly during twisting and plying. It is therefore desired that a size be provided for glass fibers which enables the fibers to be stored for periods of time longer than several days prior to being twisted and plied in the formation of yarn. Such a glass fiber size permits greater flexibility in the scheduling of the twisting and plying portions of the manufacturing process.

In accordance with the present invention, a glass fiber sizing treatment has been provided which enables the sized glass fibers to be twisted, plied, and woven without undue fuzzing, even after the fibers have been stored for more than several days after their formation and application of the size. This size does not have to be removed to render the glass fiber cloth woven from such glass fibers useful as a resin reinforcement. Furthermore, a coupling agent can be applied with this glass fiber size at the time of the formation of the fibers and need not be added to the cloth at a later time.

The glass fiber size of the present invention comprises an aqueous dispersion of zinc stearate and synthetic resin latex such as polyvinyl acetate latex. Other synthetic latices, such as butadiene-styrene, may be employed in lieu of or in combination with polyvinyl acetate as set forth below. The size may include a conventional coupling agent for rendering glass fiber surfaces compatible with resins. As shown in the drawing, the size is applied at room temperature as a thin film to the surfaces of the individual filaments 10 just after their emergence from orifices 11 in electrically heated, platinum alloy bushing 12 by means of a roller applicator 14 such as shown in U.S. Patent No. 2,728,972 and prior to the time they are grouped together by means of a graphite guide 16 such as is shown in U.S. Patent No. 2,373,078 to form the individual strand. The size may also be applied to the filaments at the same time they are grouped together by means of a pad applicator such as shown in U.S. Patent No. 2,744,563. The strand is wound on a rapidly rotating forming tube 18. The size should have a viscosity of less than 100 centipoises at 20° C. and preferably between 1 to 20 centipoises at 20° C. to permit application to the fibers.

Typical examples of the sizes which may be used in the practice of the present invention are as follows:

*Example I*

| | Parts by weight |
|---|---|
| Polyvinyl acetate latex (55% solids by weight) | 141 |
| Dibutyl phthalate | 28 |
| Zinc stearate | 38 |
| Cation X (textile lubricant and softener in the form of a paste containing 33% by weight of solids in water) | 29 |
| Arquad S (a wetting agent containing 50% by weight of active ingredients in isopropanol) | 2 |
| Water | 3,785 |

*Example II*

| | |
|---|---|
| Polyvinyl acetate latex (55% solids by weight) | 141 |
| Dibutyl phthalate | 28 |
| Volan (a 20% by weight solution of the methacrylic acid complex of chromic chloride in isopropyl alcohol and acetone) | 76 |
| Zinc stearate | 38 |
| Cation X | 29 |
| Arquad S (wetting agent) | 2 |
| Water | 3,785 |

*Example III*

| | |
|---|---|
| Polyvinyl acetate latex (55% by weight of solids) | 141 |
| Dibutyl phthalate | 28 |
| Vinyltriacetoxy silane | 35 |
| Zinc stearate | 38 |
| Cation X | 29 |
| Arquad S | 2 |
| Water | 3,785 |

*Example IV*

| | |
|---|---|
| Butadiene-styrene (48% by weight solids of a polymer containing 40% by weight butadiene and 60% by weight styrene) Dow 512K | 300 |
| Vinyltriacetoxy silane | 50 |
| Zinc stearate | 42 |
| Cation X | 32.4 |
| Ethomeen T-15 (wetting agent) | 9.0 |
| Water | 3,402 |

The above sizes can be made by making an aqueous solution of cation X (an acylated imidazoline which is formed as a reaction product of stearic acid and tetraethylene pentamine) and an aqueous solution of the wetting agent. Arquad "S" is an alkyl trimethyl ammonium chloride wherein the alkyl groups are composed of 10 percent by weight of octadecyl, 35 percent by weight of octadecenyl, 10 percent by weight of hexadecyl and 45 percent by weight of octadecadecenyl. Ethomeen T-15 is an amine selected from a group of tertiary amine wetting agents having the formula

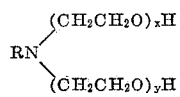

wherein R is an alkyl group having 12 to 18 carbon atoms and $x$ and $y$ may be 2 to 20. The particular amine is a tallow amine with a molecular weight of 497 and with $x$ and $y$ totaling 5. Zinc stearate is then added to the aqueous solution of the wetting agent and the mixture is agitated until the zinc stearate is thoroughly dispersed therein. The aqueous solution of cation X is next added to the mixture containing zinc stearate and thoroughly mixed therewith. The latex (and plasticizer if employed) is then added to the resulting dispersion, mixed therein and the remaining amount of water finally added. The coupling agent, when present, is added to the mixture of cation X, zinc stearate and wetting agent prior to the addition of the latex. Sufficient water is then added to bring the solution to the desired concentration and viscosity. The mixing can be accomplished with the various ingredients being at room temperature.

The combination of zinc stearate, a lubricant and a wetting agent with other glass fiber binders similar to butadiene-styrene and polyvinyl acetate in the sizing solutions permits twisting, plying and weaving without fuzzing of continuous filament, glass fibers treated with these solutions. These glass fiber binders are latices, i.e., aqueous dispersions of synthetic resins made by aqueous emulsion polymerization of ethylenic monomers such as the various acrylates which are esters of acrylic and methacrylic acid and an aliphatic alcohol having 1 to 6 carbon atoms including, for example, methyl methacrylate and methacrylate, vinyl chloride, styrene, acrylonitrile, chlorovinyl acetate, butadiene, vinylidene chloride and various copolymers of the above monomers such as butadiene-acrylonitrile, vinyl chloride-vinyl acetate copolymers and like materials which can be employed in latex form as binders for glass fiber strands. The latices generally have an average particle size of 0.1 to 5 microns. A plasticizer is used in the size with latices which tend to deposit as a brittle or discontinuous film. For example, a plasticizer is generally used with latices of polyvinyl acetate, polyvinyl chloride, the polyacrylates and polystyrene whereas a plasticizer is not generally used with a butadiene-styrene latex. The plasticizer may be any known plasticizer for the various resins such as dibutyl phthalate, tricresyl phosphate, dioctyl phthalate, diisooctyl phthalate and other esters which are conventionally used as plasticizers.

Butadiene-styrene latices have been found to be particularly useful in the practice of the invention where there is a tendency for the shuttle in the weaving operation to stick or not slide smoothly across the warp yarns. The use of the butadiene-styrene latex in the size provides a yarn which does not become sticky due to heat buildup therein caused by the friction between the shuttle and the warp yarn. Butadiene-styrene copolymers containing 40 to 60 percent by weight of butadiene and 60 to 40 percent by weight of styrene are preferred.

Various amounts of zinc stearate and binder may be present in the size. The binder or solid latex may constitute 2 to 8 percent by weight of the solution and the zinc stearate may constitute 0.5 to 2.5 percent by weight of the solution. The sum total of the solid latex, zinc stearate and other solids in the solution may constitute 2.5 to 9.5 percent by weight of the solution with the amount of zinc stearate being about 6¼ to 50 percent by weight of the solid latex. In all events, the amount of zinc stearate and binder employed should not exceed that amount for each constituent which will cause the viscosity of the solution to be greater than about 100 centipoises at 20° C. Solutions having viscosities greater than 100 centipoises at 20° C. are very difficult to apply to glass fiber strands due to the very high speeds of fiber travel during attenuation and forming. It is preferred that the viscosity of the size be between 1 to 20 centipoises at 20° C. for best results. The pH of the solution may vary from about 3 to 8 depending on the sensitivity of the latex to precipitate from the dispersion. The more sensitive the latex is to precipitation, the higher the pH of the sizing solution.

Although the zinc stearate acts as a lubricant it is preferred that a cationic active textile softener or lubricant be included in the size. This material may be an alkyl imidazoline derivative and includes compounds of the class u-alkyl N-amidoalkyl imidazolines which may be formed by causing fatty acids to react with polyalkylene polyamines under conditions which produce ring closure. These imidazolines are described more fully in U.S. Patent No. 2,200,815. Other suitable imidazolines are described in U.S. Patents 2,267,965, 2,268,273 and 2,355,837. The amount of lubricant which may be present in the sizing solution is about 0.3 to 2 percent by weight.

The aqueous solutions of zinc stearate and binder set forth above may have added thereto any one of a number of coupling agents suitable for improving surface characteristics of glass fibers for laminating with various resins. In addition to the chromic chloride complex of methacrylic acid set forth above, other complex compounds of the Werner type in which a trivalent nuclear chromium atom is coordinated with acyclic carboxylic acido groups having 3 to 20 carbon atoms such as crotonic, furoic, furfural-acrylic, and sorbic acids and all the unsaturated acids derived from linseed oil and from oiticica oil and other unsaturated acids in which the unsaturation is in the alpha to beta position may be employed. Examples of such compositions are set forth in U.S. Patents Nos. 2,552,910 and 2,611,718.

The invention is also practiced in combination with the use of various silane and siloxane materials suitable for improving the surface properties of glass fibers for resin reinforcement. For example, vinyl and allyl halo, alkoxy amino, or acyloxysilanes, their hydrolysis products and polymers of the hydrolysis products are suitable for improving the surface properties of the glass fibers. Some of these silanes are disclosed in U.S. Patents Nos. 2,563,288, 2,688,006, 2,688.007, 2,723,211, 2,742,378, 2,754,237, 2,776,910, and 2,799,598. Other coupling agents include the reaction products of vinyl trichlorosilane and organic acids and acid derivatives thereof, such as acetic acid, stearic acid, acrylic acid, formic acid, propionic acid, butyric acid, mono-esters of dibasic acids such as the monoalkyl esters of maleic, citraconic, itaconic acids, etc. Amino silanes such as gamma-amino-propyl triethoxy silanes may be used when the resin to be reinforced is an epoxy resin. The amount of coupling agent in the sizing solution is usually between 0.3 and 2 percent by weight of the size.

A wetting agent is generally employed in the size. The wetting agent is preferably cationic or non-ionic, and it may also serve as an additional lubricant. The wetting agent may be any material which is conventionally known to be useful as such and will reduce the surface tension of the sizing solution so that it is about 25 to 35 dynes per square centimeter. Such materials include cetyl or stearyl monoamine hydrochloride or acetate, dodecylamine, hexadecylamine and secondary and tertiary derivatives of the same, for example, dodecyl methylamine and salts thereof. Alkyl quaternary ammonium compounds such as trimethyl stearyl or cetyl ammonium bromides and chlorides and generally any of the amine compounds that dissociate in water systems to provide a positive radical containing a group of more than 8 and preferably 12 or more carbon atoms may be used. Other examples of suitable wetting agents are polyoxyethylene derivatives of a sorbitol fatty acid ester such as a polyoxyethylene sorbitan monostearate or a polyoxyethylene sorbitan tri-oleate. The amount of such wetting agent employed generally ranges from about 0.01 to 1 percent by weight of the aqueous sizing solution.

The size is applied to a strand of glass fibers as it is being drawn from a bushing. The roller or pad applicator mentioned above may be employed to apply the size to the strand. After application of the size to the strand, the strand is air dried at 75° F. (room temperature) for 1 to 3 days in an atmosphere maintained at about 30 percent relative humidity. The dried strand is twisted and plied at room temperature in an atmosphere of about 30 percent relative humidity and then woven into cloth. The twisting, plying and weaving are accomplished by conventional textile techniques.

The amount of size to be employed to achieve binding of the individual filaments to each other throughout their entire length or substantially their entire length depends upon the particular binder employed in the size. When polyvinyl acetate is employed as the binding constituent, it has been found that a minimum of about 0.005 pound of polyvinyl acetate per pound of 140 strand is required. A 140 strand is made up of 204 individual glass filaments grouped into a strand 14,000 yards in length per pound of strand. The amount of size employed will vary depending upon the type of strand being treated as well as the size employed. Usually the amount of solids present on the strand after sizing and drying of the strand is 0.3 to 0.8 percent by weight based upon the weight of the strand.

The invention is particularly useful when the glass fibers are to be used as a reinforcement for low pressure thermosetting type resins, for example, unsaturated polyesterethylenic monomer resins such as shown in U.S. Patent No. 2,676,947 granted to Parker. These resins are interpolymers of (A) a polyester of a dihydric alcohol such as ethylene glycol, propylene glycol, 1,3 butylene glycol, diethylene glycol, dipropylene glycol and higher polymers of alkylene glycols and an alpha, beta ethylenic dicarboxylic acid such as maleic or fumaric acid with other dicarboxylic acids such as adipic, succinic, azelaic, and phthalic acids being added, and (B) a monomer, soluble in the polyester, containing a terminal ethylenic group, $CH_2=C<$, such as styrene, vinyl acetate, vinyl toluene allyl esters including allyl acetate, allyl succinate, diallyl phthalate, diallyl cyanurate, triallyl cyanurate, dichloro styrene, etc. The invention is also useful when the glass fibers are to be laminated with other resinous or plastic materials such as polyethers or epoxy resins. These resins are condensation polymers of an epihalohydrin and polyhydroxy phenolic compounds and derivatives thereof, such as bis-phenol A.

Glass fiber cloth woven from yarn treated according to the above description with the sizing solution of Example III was laminated with an unsaturated polyester resin. The cloth is known in the trade as 181 cloth. It is formed by using 225⅓ glass fiber yarn for both the warp and the fill and weaving the yarn according to a 1 to 8 satin weave pattern. The cloth was not heat cleaned or otherwise treated prior to lamination with the resin.

Thirteen plies of the cloth were individually saturated with the resin and then stacked upon each other with each succeeding layer being rotated so that the fiber orientation of one layer was at about a 45° angle to the next layer. The resin was a polymerizable mixture of styrenated polyesters containing about 2 percent by weight of methyl ethyl ketone peroxide and 3 percent by weight of cobalt. The assembly was cured for 2½ hours at room temperature under vacuum to press the plies together and cure the resin. The resulting laminate containing about 62.7 percent by weight of glass had a dry flexural strength of 37,249 pounds per square inch. After a two hour immersion in boiling water, the flexural strength of the laminate was 37,123 pounds per square inch.

Glass fiber strands treated with the above described sizes can be twisted, plied and woven into cloth without the occurrence of undue fuzzing during the various operations. Furthermore, glass fiber strands treated with such sizes can be stored for more than several days after their formation and application of the size and can be subsequently twisted, plied and woven into cloth without the occurrence of undue fuzzing in any of these operations. The woven cloth made from strands treated according to the present invention can be laminated with resins without heat treatment or finishing treatment of the cloth. Glass fibers capable of such uses have not heretofore been available.

Although the present invention has been described with respect to specific details of certain embodiments thereof, it is not intended that such details act as limitations upon the scope of the invention except insofar as set forth in the accompanying claims. The application is a continuation-in-part of my copending application Serial No. 552,985, filed December 14, 1955, and now abandoned.

I claim:

1. In a method of forming a glass fiber, reinforced, resinous body which comprises forming glass fiber strands by drawing them from molten glass through orifices in a bushing to form individual glass filaments, moving the filaments away from the bushing at a high rate of speed and forming the filaments into a strand, applying a size to the filaments during their formation to provide a thin film of the size on the surfaces of the glass filaments while they are moving at this speed, twisting, plying and weaving the strands to form a glass fiber fabric, combining the sized fabric with a curable resin which is compatible with the size without removing the size from the glass fibers and curing the combination to form the reinforced body, the improvement which consists of using as the size an aqueous solution which consists essentially of 2 to 8 percent by weight on a solids basis of a synthetic latex made by aqueous emulsion polymerization of an ethylenic monomer, 0.5 to 2.5 percent by weight of zinc stearate, the amount of zinc stearate being 6¼ to 50 percent by weight of the latex, 0.3 to 2 percent by weight of a textile lubricant and 0.01 to 1 percent by weight of a wetting agent, the total solids content of the solution being 2.5 to 9.5 percent by weight and the viscosity of the solution being less than 100 centipoises at 20° C.

2. In the method of forming a glass fiber, reinforced, resinous body which comprises forming glass fiber strands by drawing them from molten glass through orifices in a bushing to form individual glass filaments, moving the filaments away from the bushing at a high rate of speed, and forming the filaments into a strand, applying a size to the filaments during their formation to provide a thin film of the size on the surfaces of the glass filaments while they are moving at this speed, twisting, plying and weaving the strands to form a glass fiber fabric, combining the sized fabric with a curable resin which is compatible with the size without removing the size from the glass fibers and curing the combination to form the reinforced body, the improvement which consists of using as the size an aqueous solution which consists essentially of 2 to 8 percent by weight on a solids basis of a synthetic latex made by aqueous emulsion polymerization of an ethylenic monomer, 0.5 to 2.5 percent by weight of zinc stearate, the amount of zinc stearate being 6¼ to 50 percent by weight of the latex, 0.3 to 2 percent by weight of a textile lubricant, 0.01 to 1 percent by weight of a wetting agent and 0.3 to 2 percent by weight of a coupling agent, the total solids content of the solution being 2.5 to 9.5 percent by weight and the viscosity of the solution being less than 100 centipoises at 20° C.

3. A method of forming sized glass fiber strands which can be twisted, plied and woven into a fabric and impregnated with a resin without removal of the size which comprises drawing glass streams through orifices in a bushing to form individual glass filaments, moving the filaments away from the bushing at a high rate of speed and forming them into a strand and applying a thin film of size on the surfaces of the filaments while they are moving at this speed, said size being an aqueous solution consisting essentially of 2 to 8 percent by weight on a solids basis of a synthetic latex made by aqueous emulsion polymerization of an ethylenic monomer, 0.5 to 2.5 percent by weight of zinc stearate, the amount of zinc stearate being 6¼ to 50 percent by weight of the latex, 0.3 to 2 percent by weight of a textile lubricant and 0.01 to 1 percent by weight of a wetting agent, the total solids content of the solution being 2.5 to 9.5 percent by weight and the viscosity of the solution being less than 100 centipoises at 20° C.

4. The method of forming sized glass fiber strands which can be twisted, plied and woven into a fabric and impregnated with a resin without removal of the size which comprises drawing glass streams through orifices in a bushing to form individual glass filaments, moving the filaments away from the bushing at a high rate of speed, and forming them into a strand and applying a thin film of a size on the surfaces of the filaments while they are moving at this speed, said size being an aqueous solution consisting essentially of 2 to 8 percent by weight on a solids basis of a synthetic latex made by aqueous emulsion polymerization of an ethylenic monomer, 0.5 to 2.5 percent by weight of zinc stearate, the amount of zinc stearate being 6¼ to 50 percent by weight of the latex, 0.3 to 2 percent by weight of a textile lubricant, 0.01 to 1 percent by weight of a wetting agent and 0.3 to 2 percent by weight of a coupling agent, the total solids content of the solution being 2.5 to 9.5 percent by weight and the viscosity of the solution being less than 100 centipoises at 20° C.

5. A method of forming a glass fiber, reinforced, resinous body which comprises forming glass fiber strands by drawing them from molten glass through orifices in a bushing to form individual glass filaments, moving the filaments away from the bushing at a high rate of speed and forming the filaments into a strand, applying a thin film of a size on the surfaces of the filaments during their formation while they are moving at this speed, said size being an aqueous solution which consists essentially of 2 to 8 percent by weight of a synthetic latex made by aqueous emulsion polymerization of an ethylenic monomer, 0.5 to 2.5 percent by weight of zinc stearate, the amount of zinc stearate being 6¼ to 50 percent by weight of the latex, 0.3 to 2 percent by weight of a textile lubricant, 0.01 to 1 percent by weight of a wetting agent and 0.3 to 2 percent by weight of a coupling agent, the total solids content of the solution being 2.5 to 9.5 percent by weight and the viscosity of the solution being less than 100 centipoises at 20° C., twisting, plying and weaving the sized strands to form a glass fiber fabric, combining the sized fabric with a curable resin which is compatible with the size without removing the size from the glass fibers and curing the combination to form the reinforced body.

References Cited in the file of this patent

UNITED STATES PATENTS

| | | |
|---|---|---|
| 2,278,207 | Mathes | Mar. 31, 1942 |
| 2,446,976 | Cousins | Aug. 10, 1948 |
| 2,491,526 | Sparks et al. | Dec. 20, 1949 |
| 2,604,688 | Slayter | July 29, 1952 |
| 2,666,038 | Eisen | Jan. 12, 1954 |
| 2,673,824 | Biefeld et al. | Mar. 30, 1954 |
| 2,688,007 | Steinman | Aug. 31, 1954 |
| 2,732,883 | Morrison et al. | Jan. 31, 1956 |
| 2,799,598 | Biefeld et al. | July 16, 1957 |

FOREIGN PATENTS

| | | |
|---|---|---|
| 543,434 | Great Britain | Feb. 25, 1942 |